(12) United States Patent
Sun et al.

(10) Patent No.: US 10,281,754 B2
(45) Date of Patent: May 7, 2019

(54) DISPLAY DEVICE

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Yansheng Sun, Beijing (CN); Huijun Li, Beijing (CN); Xinhua Jia, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 131 days.

(21) Appl. No.: 15/327,350

(22) PCT Filed: Feb. 14, 2016

(86) PCT No.: PCT/CN2016/073768
§ 371 (c)(1),
(2) Date: Jan. 18, 2017

(87) PCT Pub. No.: WO2017/049846
PCT Pub. Date: Mar. 30, 2017

(65) Prior Publication Data
US 2017/0307930 A1    Oct. 26, 2017

(30) Foreign Application Priority Data
Sep. 22, 2015 (CN) .......................... 2015 1 0608440

(51) Int. Cl.
*G02F 1/1333* (2006.01)
*G02F 1/03* (2006.01)
*G02F 1/133* (2006.01)

(52) U.S. Cl.
CPC ...... *G02F 1/133308* (2013.01); *G02F 1/0311* (2013.01); *G02F 1/133* (2013.01);
(Continued)

(58) Field of Classification Search
CPC .. G02F 1/133308; G02F 1/133; G02F 1/0311; G02F 1/1333; G02F 2001/13332; G02F 2001/133331
See application file for complete search history.

(56) References Cited

U.S. PATENT DOCUMENTS

2013/0107161 A1    5/2013    Choi et al.
2014/0226103 A1    8/2014    Zhuang et al.
(Continued)

FOREIGN PATENT DOCUMENTS

CN    102122093 A    7/2011
CN    103513446 A    1/2014
(Continued)

OTHER PUBLICATIONS

Office Action in Chinese Application No. 201510608440.X dated Jun. 29, 2017, with English translation.
(Continued)

*Primary Examiner* — Charles S Chang
(74) *Attorney, Agent, or Firm* — Womble Bond Dickinson (US) LLP

(57) ABSTRACT

The present invention relates to the field of display technology and discloses a display device. The display device comprises a decorative frame, a cover glass, a display panel, a back plate and a connecting component. The back plate, the display panel and the connecting component are located in the decorative frame. The connecting component is mounted on the back plate. The decorative frame surrounds the display panel; the connecting component is arranged between the decorative frame and the display panel. The (Continued)

cover glass is adhered to the connecting component and covers the display panel, the connecting component and the decorative frame. In the display device, the back plate, display panel and connecting component are located within the decorative frame; the cover glass is connected to the back plate through the connecting component and covers the components between the cover glass and the back plate.

7 Claims, 1 Drawing Sheet

(52) U.S. Cl.
CPC .. *G02F 1/1333* (2013.01); *G02F 2001/13332* (2013.01); *G02F 2001/133331* (2013.01)

(56) References Cited

U.S. PATENT DOCUMENTS

| | | | | |
|---|---|---|---|---|
| 2014/0253823 | A1* | 9/2014 | An | G06F 3/041 349/12 |
| 2015/0373865 | A1* | 12/2015 | Byeon | H05K 5/0017 361/679.01 |
| 2016/0139627 | A1 | 5/2016 | Fang et al. | |
| 2017/0146851 | A1 | 5/2017 | Shi | |

FOREIGN PATENT DOCUMENTS

| | | |
|---|---|---|
| CN | 104181716 A | 12/2014 |
| CN | 104199206 A | 12/2014 |
| CN | 104317459 A | 1/2015 |
| CN | 104376783 A | 2/2015 |
| CN | 204595376 U | 8/2015 |
| CN | 105158951 A | 12/2015 |
| KR | 20100011849 A | 2/2010 |
| KR | 20130045569 A | 5/2013 |

OTHER PUBLICATIONS

International Search Report and Written Opinion in PCT/CN2016/073768 dated Jun. 3, 2016, with English translation. 14 pages.

Office Action received for Chinese Patent Application No. 201510608440.X, dated Mar. 16, 2018, 11 pages (6 pages of English Translation and 5 pages of Office Action).

International Preliminary Report on Patentability received for PCT Patent Application No. PCT/CN2016/073768, dated Apr. 5, 2018, 13 pages (8 pages of English Translation and 5 pages of Original Document).

* cited by examiner

DISPLAY DEVICE

RELATED APPLICATIONS

The present application is the U.S. national phase entry of the international application PCT/CN2016/073768, with an international filing date of Feb. 14, 2016, which claims the benefit of Chinese Patent Application No. 201510608440.X, filed on Sep. 22, 2015, the entire disclosures of which are incorporated herein by reference.

TECHNICAL FIELD

The present invention relates to the field of display technology, in particular to a display device.

BACKGROUND

At present, in the field of liquid crystal display technology, the borderless design of display device is a development trend. Since the thickness of the border is reduced, a broader perspective can be obtained for a user viewing the TV screen. For a given size, a narrow border/borderless TV looks bigger and provides better viewing effect. Moreover, by removing the border, the display screen looks as a whole without stitching traces; the appearance is thus very beautiful.

As shown in FIG. 1, an existing display device is composed of a cover glass 01, a liquid crystal panel 02, a front frame 03, a decorative frame 04 and a back plate 05. The cover glass 01, front frame 03 and decorative frame 04 are spliced into a display screen. The entire display screen has obvious stitching traces and the appearance has borders, causing a poor viewing effect. Such a display device cannot meet the development trend of the borderless design and the requirement of the consumers pursuing a perfect visual effect.

SUMMARY

An embodiment of the present invention provides a display device with a borderless appearance, which is conducive to providing a beautiful appearance.

To this end, the embodiments of the present invention provide the following solutions.

An embodiment of the present invention provides a display device. The display device comprises a decorative frame, a cover glass, a display panel, a back plate and a connecting component. The back plate, the display panel and the connecting component are located in the decorative frame. The connecting component is mounted on the back plate. The decorative frame surrounds the display panel; the connecting component is arranged between the decorative frame and the display panel. The cover glass is adhered to the connecting component and covers the display panel, the connecting component and the decorative frame.

In the display device, the back plate, display panel and connecting component are located within the decorative frame; the cover glass is connected to the back plate through the connecting component and covers the components between the cover glass and the back plate. The decorative frame, display panel, connecting component and back plate are located on a side of the cover glass departing from a viewer. Only the cover glass can be seen on the viewing side.

Therefore the display device has a borderless appearance, which is conducive to providing a beautiful appearance.

Optionally, a surface of the cover glass facing the back plate is adhered to the connecting component with a double-sided adhesive.

Optionally, the connecting component comprises a bracket and a connecting piece; the bracket is locked to the back plate through the connecting piece; a surface of the cover glass facing the back plate is adhered to the bracket.

Optionally, the connecting piece is a hook.

Optionally, the hook is fixed to the back plate and hung on the bracket.

Optionally, the hook is fixed to the back plate through a fastening screw; the hook is hung on the bracket through a hanging hole provided on the bracket.

Optionally, the hook is fixed to the bracket and hung on the back plate.

Optionally, the bracket has an enclosed annular structure and the connecting component comprises a plurality of connecting pieces; a surface of the bracket facing the cover glass forms a continuous adhesive surface; a marginal region of a surface of the cover glass facing the back plate is adhered to the adhesive surface.

Optionally, a shape of a cross section of the bracket is a U-shaped structure with an opening departing from the cover glass.

Optionally, the plurality of connecting pieces are uniformly distributed on the periphery of the display panel.

DETAILED DESCRIPTION OF THE INVENTION

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Figure 1:
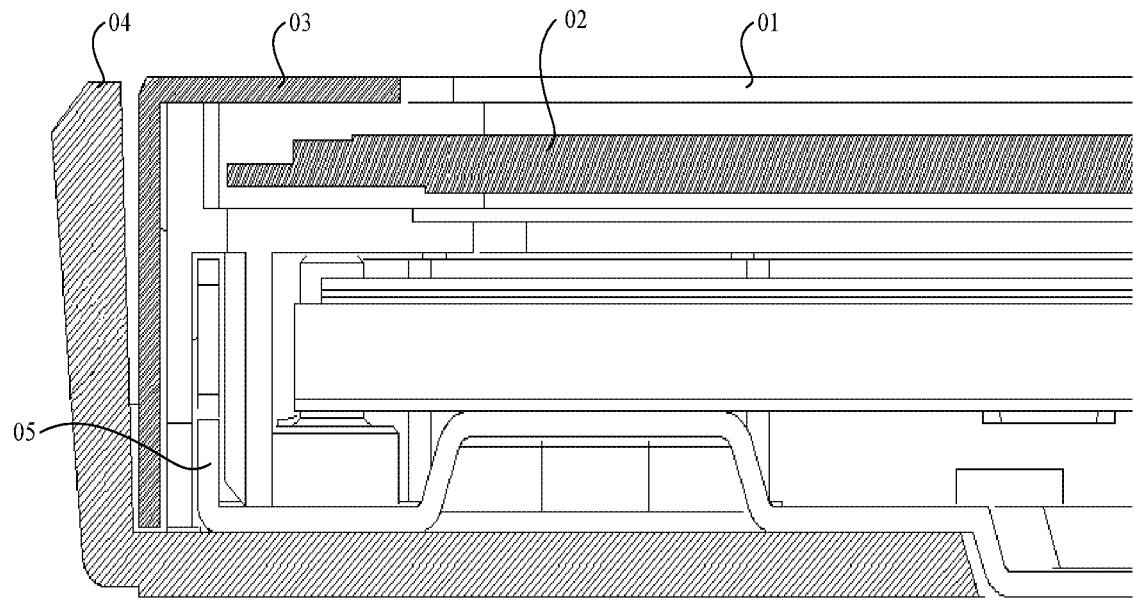
FIG. 1 is a structural schematic diagram of an existing display device of the prior art.
Figure 2:
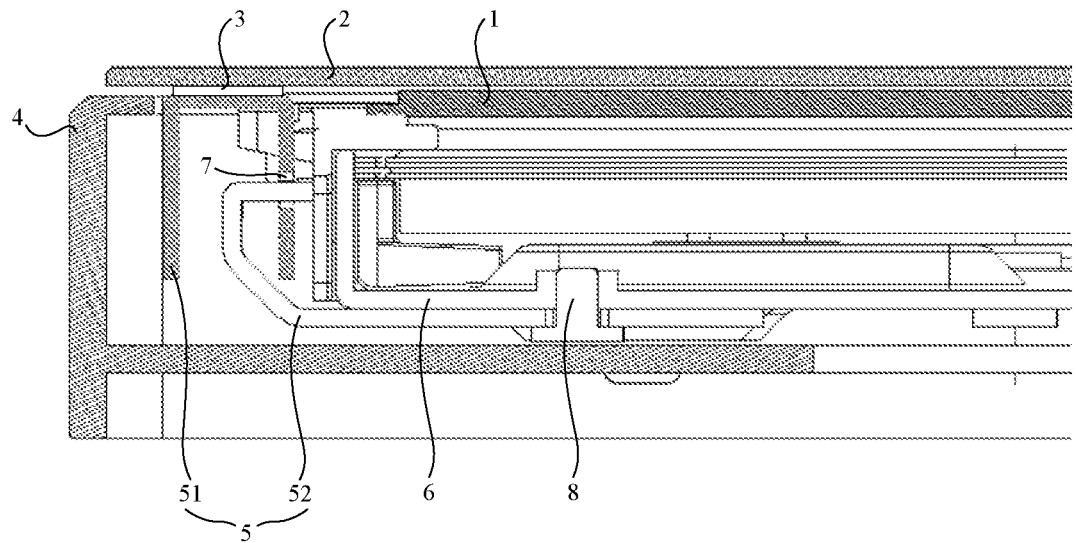
FIG. 2 is a structural schematic diagram of a display device according to an embodiment of the present invention.

As shown in FIG. 2, an embodiment of the present invention provides a display device. The display device comprises a decorative frame 4, a cover glass 2, a display panel 1, a back plate 6 and a connecting component 5. The back plate 6, the display panel 1 and the connecting component 5 are located in the decorative frame 4. The connecting component 5 is mounted on the back plate 6. The decorative frame 4 surrounds the display panel 1; the connecting component 5 is arranged between the decorative frame 4 and the display panel 1. The cover glass 2 is adhered to the connecting component 5 and covers the display panel 1, the connecting component 5 and the decorative frame 4.

In the display device, the back plate 6, display panel 1 and connecting component 5 are located within the decorative frame 4; the cover glass 2 is connected to the back plate 6 through the connecting component 5 and covers the components between the cover glass 2 and the back plate 6. The decorative frame 4, display panel 1, connecting component 5 and back plate 6 are located on a side of the cover glass 2 departing from a viewer. Only the cover glass 2 can be seen on the viewing side.

Therefore the display device has a borderless appearance, which is conducive to providing a beautiful appearance.

As shown in FIG. 2, to realize adhesion between a surface of the cover glass 2 facing the back plate 6 and the connecting component 5, in an optional embodiment, the surface of the cover glass 2 facing the back plate 6 is adhered to the connecting component 5 with a double-sided adhesive 3. On the basis of realizing the same connecting function, compared with the mechanical connection, the connection of the double-sided adhesive 3 has the advantages of simple operation and low cost. Moreover, by applying the double-sided adhesive 3, additional processes are not necessary for the cover glass 2 and connecting component 5, the cover glass 2 will thus not be damaged. The cover glass 2 is located outside the decorative frame 4; the back plate 6, display panel 1 and connecting component 5 are located within the decorative frame 4; the cover glass 2 is adhered to the connecting component 5 through the double-sided adhesive 3. That is, the entire display device is formed by fixing the cover glass 2 on the connecting component 5. Only the cover glass 2 can be seen on the viewing side. Therefore, the use of double-sided adhesive 3 does not affect the appearance of the display device.

In an optional embodiment, the connecting component 5 comprises a bracket 51 and a connecting piece; the bracket 51 is locked to the back plate 6 through the connecting piece; a surface of the cover glass 2 facing the back plate 6 is adhered to the bracket 51. The surface of the cover glass 2 facing the back plate 6 is adhered to the bracket 51; the bracket 51 is connected to the connecting piece; and the connecting piece is connected to the back plate 6. Therefore, a fixed connection can be formed between the cover glass 2 and the back plate 6. The cover glass 2 can be connected to the bracket 51 with the double-sided adhesive 3 in the abovementioned embodiment. The connection between the bracket 51 and the connecting piece is not limited herein, nor is the connection between the connecting piece and the back plate 6. An appropriate connection such as threaded connection and connection with hanging hole can thus be selected based on good connection strength. Therefore, a fixed connection between the cover glass 2 and the back plate 6 can be realized by adhering the cover glass 2 to the bracket 51 and locking the bracket 51 to the back plate 6 with the connecting piece.

As shown in FIG. 2, in particular, the connecting piece is a hook 52. The hook 52 can be made of a plastic material or a metal material with low cost. The size, shape and properties of the hook 52 can be determined according to the specific size of the display device and the actual situation. On a basis of good connection strength between the hook 52 and the bracket 51, and good connection strength between the hook 52 and back plate 6, if the space in the display device is relatively compact, the shape of the hook 52 can be designed to be narrow for saving space. In addition, for locking the bracket 51 to the back plate 6, the connecting piece can have other structures such as a clasp for hanging.

In an optional embodiment, as shown in FIG. 2, the hook 52 is fixed to the back plate 6 and hung on the bracket 51. The fixed connection between the hook 52 and the back plate 6 can be realized with mechanical connection such as threaded connection or other types of connection. The hook 52 can be connected to the bracket 51 with hanging connection having advantages of simple operation, convenient assembly/disassembly, and convenient replacement. If one of the hook 52 and the bracket 51 is damaged, a new component can be used to replace the damaged component, and the undamaged component can then cooperate with the new component.

In an optional embodiment, as shown in FIG. 2, the hook 52 is fixed to the back plate 6 through a fastening screw 8; the hook 52 is hung on the bracket 51 through a hanging hole 7 provided on the bracket 51. The hook 52 can be connected to the back plate 6 through a fastening screw 8 or a pin. A hanging hole 7 is provided on the bracket 51 for hanging the hook 52. In the assembling process, the bracket 51 can be directly hung on the hook 52 through the hanging hole 7, realizing the connection between the bracket 51 and the hook 52, and the operation is convenient In an optional embodiment, the hook 52 is fixed to the bracket 51 and hung on the back plate 6. A threaded hole can be provided on the bracket 51. A screw thread matching the threaded hole on the bracket 51 can be provided on a portion of the hook 52 to be connected to the bracket 51. A fixed connection between the hook 52 and the bracket 51 can be realized with threaded connection. The hanging connection between the hook 52 and the back plate 6 can be realized by providing a hanging hole on the hook 52 and providing a hanging component matching the hanging hole of the hook 52 on the back plate 6, thereby realizing the connection between the hook 52 and the back plate 6.

In an optional embodiment, as shown in FIG. 2, the bracket 51 has an enclosed annular structure and the connecting component comprises a plurality of connecting pieces; a surface of the bracket 51 facing the cover glass 2 forms a continuous adhesive surface; a marginal region of a surface of the cover glass 2 facing the back plate 6 is adhered to the adhesive surface. With the enclosed annular structure of the bracket 51, the connection between the bracket 51 and the cover glass 2 can have an increased contact area for adhering, thereby improving reliability and stability for adhesion between the bracket 51 and the cover glass 2. The adhesive surface of the bracket 51 with the enclosed annular structure is adhered to the marginal region of a surface of the cover glass 2 facing the back plate 6, thereby fixing the cover glass 2 on the bracket 51. The cover glass 2 covers the display panel 1; the bracket 51 is connected to the back plate 6 with a plurality of connecting pieces. Moreover, the cover glass 2 and the display panel are fixed on the back plate 6, the cover glass is located outside the decorative frame 4. Therefore the display device has a borderless appearance, which is conducive to providing a beautiful appearance.

In particular, a shape of a cross section of the bracket 51 is a U-shaped structure with an opening departing from the cover glass 2. The U-shaped structure can be obtained by pressing a metal sheet or forming with a plastic material. The manufacture is simple and the cost is low. The shape of the cross section of the bracket 51 can also be other appropriate shape.

In particular, the plurality of connecting pieces are uniformly distributed on the periphery of the display panel 1. The connecting pieces can be provided on the four corners of the display device. The number of the connecting pieces can be determined based on the specific size of the display device.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A display device comprising a decorative frame, a cover glass, a display panel, a back plate and a connecting component;
   wherein the back plate, the display panel and the connecting component are located in the decorative frame, and the connecting component is mounted on the back plate;
   wherein the decorative frame surrounds the display panel; the connecting component is arranged between the decorative frame and the display panel; the cover glass is adhered to the connecting component and covers the display panel, the connecting component and the decorative frame; and
   wherein the connecting component comprises a bracket and a connecting piece; the connecting piece is a hook fixed to the back plate; the hook penetrates through a hanging hole provided on the bracket and is hung on the bracket.

2. The display device according to claim 1, wherein a surface of the cover glass facing the back plate is adhered to the connecting component with a double-sided adhesive.

3. The display device according to claim 1, wherein a surface of the cover glass facing the back plate is adhered to the bracket.

4. The display device according to claim 1, wherein the hook is fixed to the back plate through a fastening screw.

5. The display device according to claim 1, wherein the bracket has an enclosed annular structure and the connecting component comprises a plurality of connecting pieces; a surface of the bracket facing the cover glass forms a continuous adhesive surface; a marginal region of a surface of the cover glass facing the back plate is adhered to the adhesive surface.

6. The display device according to claim 5, wherein a shape of a cross section of the bracket is a U-shaped structure with an opening departing from the cover glass.

7. The display device according to claim 5, wherein the plurality of connecting pieces are uniformly distributed on the periphery of the display panel.

* * * * *